US 6,742,059 B1

United States Patent
Todd et al.

(10) Patent No.: US 6,742,059 B1
(45) Date of Patent: May 25, 2004

(54) PRIMARY AND SECONDARY MANAGEMENT COMMANDS FOR A PERIPHERAL CONNECTED TO MULTIPLE AGENTS

(75) Inventors: Stephen Todd, Shrewsbury, MA (US); Andreas Bauer, Acton, MA (US); David Kurt Spencer, Northborough, MA (US); Walter T. Dobberpuhl, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/498,287

(22) Filed: Feb. 4, 2000

(51) Int. Cl.[7] ............................ G06F 3/00; G06F 15/173
(52) U.S. Cl. ..................... 710/19; 709/219; 709/224; 710/15
(58) Field of Search ................. 710/15–19, 10; 709/223, 224, 219

(56) References Cited

U.S. PATENT DOCUMENTS 4,731,768 A * 3/1988 Easterday .................. 368/118
6,020,889 A * 2/2000 Tarbox et al. .............. 345/736
6,101,498 A * 8/2000 Scaer et al. ................. 707/10
6,253,240 B1 * 6/2001 Axberg et al. .............. 709/223
6,363,421 B2 * 3/2002 Barker et al. ............... 709/223
6,487,590 B1 * 11/2002 Foley et al. ................ 709/223

OTHER PUBLICATIONS

Stallings, William. "SNMP, SNMPv2, SNMPv3, and RMON 1 and 2". Addison–Wesley, 3$^{rd}$ edition, pp. 365–385.*

* cited by examiner

Primary Examiner—David Wiley
Assistant Examiner—George Neurauter
(74) Attorney, Agent, or Firm—Robert Kevin Perkins; Leanne J. Fitzgerald; John M. Gunther

(57) ABSTRACT

There is disclosed a client-server configuration including a peripheral device wherein multiple servers interface with both the client and the peripheral. Management software for determining the operating state of the peripheral, known as server agent software, is employed in the multiple servers under control of the client. In order to avoid conflicting information reflecting multiple operating states of the peripheral, a primary/secondary algorithm is used to enable the client to determine only one peripheral operating state while allowing each server to also verify its connectivity to the peripheral and to the client.

20 Claims, 9 Drawing Sheets

PRIMARY AND SECONDARY MANAGEMENT COMMANDS FOR A PERIPHERAL CONNECTED TO MULTIPLE AGENTS

BACKGROUND OF THE INVENTION

1. Field of the Invention

This patent application relates to computer systems, and more particularly relates to management software for controlling one or more peripherals connected to multiple servers.

2. Description of Prior Art

Software may be placed in context by reference to FIG. 1A which depicts a software "field" and is presented as an aid to understanding the context of the present invention. FIG. 1A shows three basic divisions of software: (1) Firmware or BIOS (Basic Input/Output System); (2) Operating System software; and (3) Applications software. The relationship of these various software categories to each other are generally suggested by their respective juxtapositions in the diagram. The firmware (BIOS) software is needed to get the computer system "booted-up" or turned on. The operating system runs on top of the BIOS and is needed to bring the computer system to life, to enable it to run or operate—kind of the lifeblood of the system. The application software runs on the operating system software, and directs the computer in a particular task of interest. A detailed discussion of each of the entries on the field is not undertaken herein, but each entry is somewhat self-explanatory.

This field of software is not complete and many more software entries could have been made, known by various names such as: daemons, processes, threads, API (Application Programmers Interface), sockets, algorithms, data structures, etc. Each of these software names has special meaning in the software arts. These pieces of software, others shown on FIG. 1A, and others not mentioned can interconnect with each other and firmware, and hardware in a concerted effort to manage or control the overall computer system operation in a manner to provide the result desired by the computer system human user. Regardless of the size or complexity of the computer system or computer system network, with multiple layers of software, in every system electrons ultimately flow over conductive paths and through electrical nodes in a manner that the nodes are either at a high voltage (high) or low voltage (low) at any given computer clock cycle (snapshot in time). It is the controlling of each of these nodes, perhaps trillions of them per computer system, on an individual node basis, to be either high or low at any specific point in time, and the controlling of the sequence of how each one of these nodes changes from high to low and vice versa, which is the job of the various software on the computer system working in concert with each other, which produces the desired result for the human computer user. Future computer systems might employ technology other than electrical, as for example optical or molecular technology. In any event, the present invention falls into one of these categories of software, and relates to memory management software, shown in FIG. 1A in the operating system category.

In the typical client-server relationship, the client needs to periodically determine the state or status of the peripheral device connected from the server. This state determination is typically accomplished in the prior-art by use of management software under control of the client. The simplest configuration of a single client, single server and single peripheral (in this case a disk array) is shown in prior-art FIG. 1. In this instance the client connects to the server by way of a local area network (LAN). The server is running the management software commonly known as "agent software" or as an "agent". This agent software can directly communicate with the peripheral device via the physical cable connecting the server to the peripheral.

The server agent software, when actively managing the peripheral device, can operate in either one of two modes: as a "pass through" or as a "cache". A cache is a high speed memory, and if operating as a "cache" then some information is retained. The cache agent maintains an image of the peripheral state that is occasionally refreshed at a certain polling interval. A pass through agent retains no state information about the peripheral device, but simply serves as a conduit between the client's application software and the peripheral device.

For many applications the caching approach is preferred, typically for managing large-scale peripherals such as disk arrays or tape jukeboxes. Caching permits quick agent response to multiple client inquiries, in the instance of a multiple-client system. Also, caching has the capability to throttle the number of requests sent to a peripheral if there are multiple client applications flooding the management agent software with requests.

As noted, a cached agent can record information, and peripherals often generate one-time events that they pass to connected servers. This event notification, in a cached agent environment, can be stored and queried in a central location which is very convenient. Further advantage in using a cached agent is logging events: each time the agent server receives a new event from the peripheral, it can also log the event in the server's system log—SYSLOG on UNIX, or NT Event log on Windows NT. This could be critical for system administrator software which may be experiencing problems on a server and which needs to correlate these problems with what may have happened to the peripheral.

The cached agent architecture works well when there is only one server, as in prior-art FIG. 1 client applications, such as a graphical user interface, (GUI), can monitor the cached agent software by issuing "change requests", and the agent can respond by sending those objects in the cache that have recently changed, and thus update any pertinent GUI display windows.

However, when there are multiple servers, as in FIG. 2, managing the same peripheral, traditional prior-art agent caching architectures begin to experience a variety of problems. For example, in a system with four servers connected to a single disk array peripheral, as in FIG. 2, there are four separate server agents maintaining four separate caches. Client application software managing the disk array would ordinarily communicate with all four agents for the purpose of verifying that the connection between each server and disk array is good, meaning that each server is able to effectively use the disk array through its channel. As the client application queries each agent for state changes to its agent cache, a number of undesirable things can happen. Each agent sends over its changes to the client, but only the first agent to do so sends data that is not redundant, unnecessary, and potentially conflicting (or stale). The second, third, and fourth agents will necessarily send data that is redundant, unnecessary, and potentially conflicting (or stale). Redundant data shall confuse the client application software (or potentially the user of the client application software). And, the redundant data will use up unnecessary network bandwidth for the connection between client and servers. The present invention offers a solution to this aforementioned inherent redundancy problem when a client-server arrangement is configured with multiple servers controlling one or more peripherals. This solution permits client management of a peripheral connected to multiple servers which provides for a coherent, consistent view of the peripheral state, as well as allowing for efficient utilization of network bandwidth during an update of the client application.

SUMMARY OF THE INVENTION

Within the context of a client-server computer system configuration, the present invention solves the problem of obtaining and resolving conflicting peripheral device state change information, which would normally be obtained when the peripheral device is connected to multiple servers and where each server is running agent software under control of the client. In such computer system which includes a client, a multiple number of servers each connected to the client, and at least one peripheral device managed by the servers, the present invention includes software for initiating a primary request and secondary requests for state changes occurring in the peripheral device. That software further includes the capability, within each of the servers and responsive to the initiating of the requests, to report peripheral state changes to the client, differentiate the primary request from the secondary requests, report a primary level of information detail to the client responsive to the primary request, and a secondary level of information detail to the client responsive to any one of the secondary requests. The primary level of information detail is complete state change information and the secondary level of information detail does not conflict with said complete state change information. Primary level or complete state change information includes, but is not limited to: state of a connection between a particular server and its peripheral, status of all hardware components in the peripheral, logical configuration of memory, disks, or other hardware components, history of events, and serial number identification information uniquely identifying that peripheral or each peripheral (if more than one is employed in the system), etc. By contrast, secondary level information would be the state of the connection between another server and the peripheral, which does not conflict with the aforementioned complete state change information. Secondary level information is thus less than, and possibly a subset of, the primary level information. These various pieces of information are each embodied as a software "object". (A software "object" can be conceptualized as a "container" or "bucket" into which is placed related items of data; more realistically the object is a portion of physical or logical memory which forms the "container".)

In a further feature of the present invention, the secondary level of information detail is limited to particular information associated with a particular one of the servers. The particular information is state-of-connection information with regard to the peripheral device. Under circumstances of a failed connection, the state-of-connection information is a connection-failure-object. The present invention further relates to a methodology to be practiced on the foregoing computer system to assess a peripheral device's state change status stored in cache memories of the multiple servers employed in the system. The methodology steps include (a) requesting state change status; (b) determining the primary or secondary nature of the request; (c) if primary obtaining complete state change status; (d) if secondary obtaining limited state change status that does not conflict with the complete status; and (e) repeating these steps until each server has been polled and has provided its status to the client. In the circumstance where at least one of the servers has a failed connection to the peripheral, the limited state change status for that one server is a connection-failure-object; under these conditions, the present invention further includes the steps of detecting that status and unless the primary request had been generated, generating the primary request as the next request.

It is thus advantageous to employ the present invention in any client-server computer system which employs multiple servers and agent software for determining the operating state of a peripheral-device, such as, for example, a disk drive or a printer.

It is a general object of the present invention to provide an improved client-server computer system.

It is another object of the present invention to provide improved memory management software.

It is yet another object of the present invention to provide a solution to the problem of obtaining and resolving conflicting peripheral device state change information for certain computer system configurations.

Other objects and advantages of the present invention will be understood after referring to the detailed description of the preferred embodiments and to the appended drawings wherein:

INTRODUCTION

Figure 1:
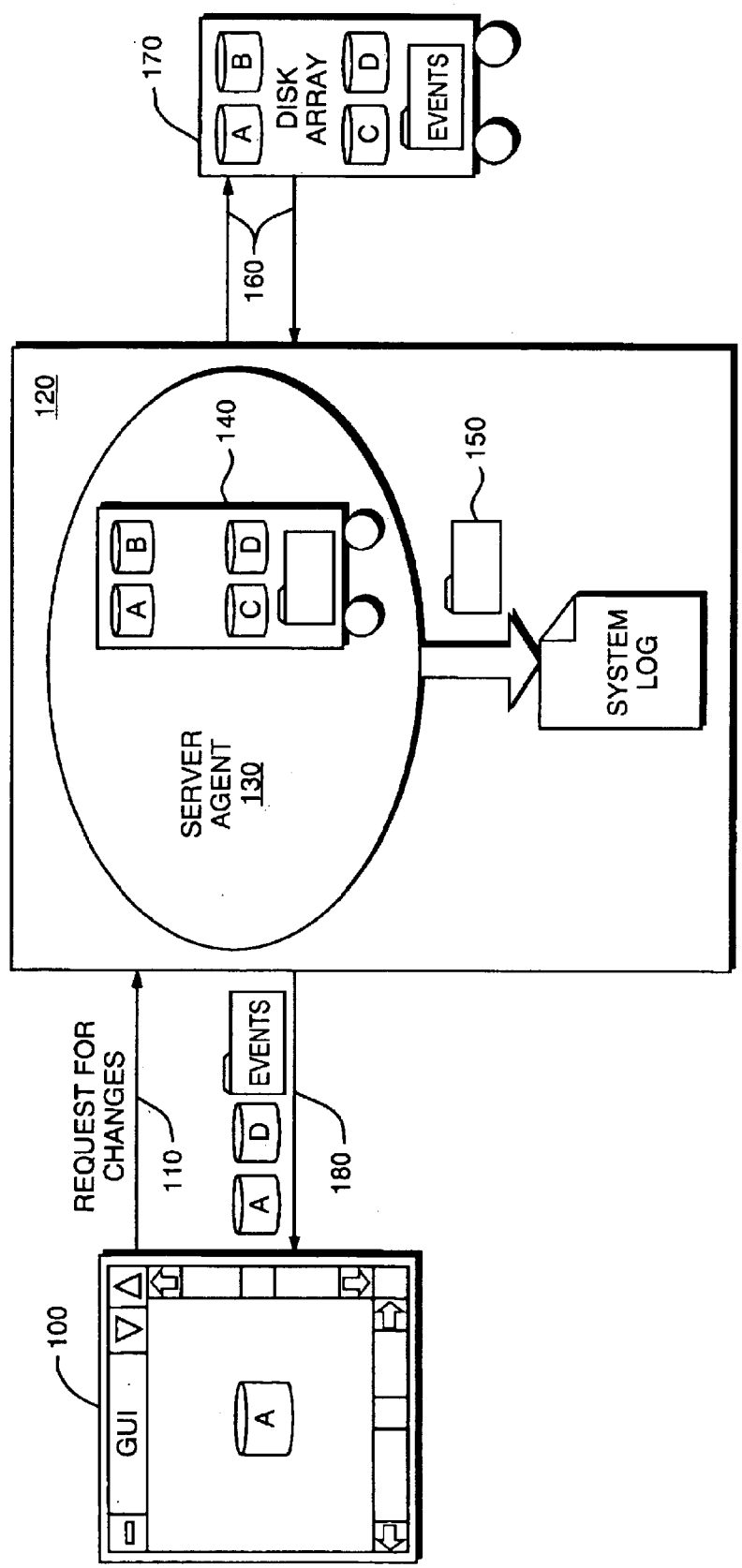
FIG. 1 depicts a client-server computer system showing a single server and a single peripheral device.
Figure 1A:
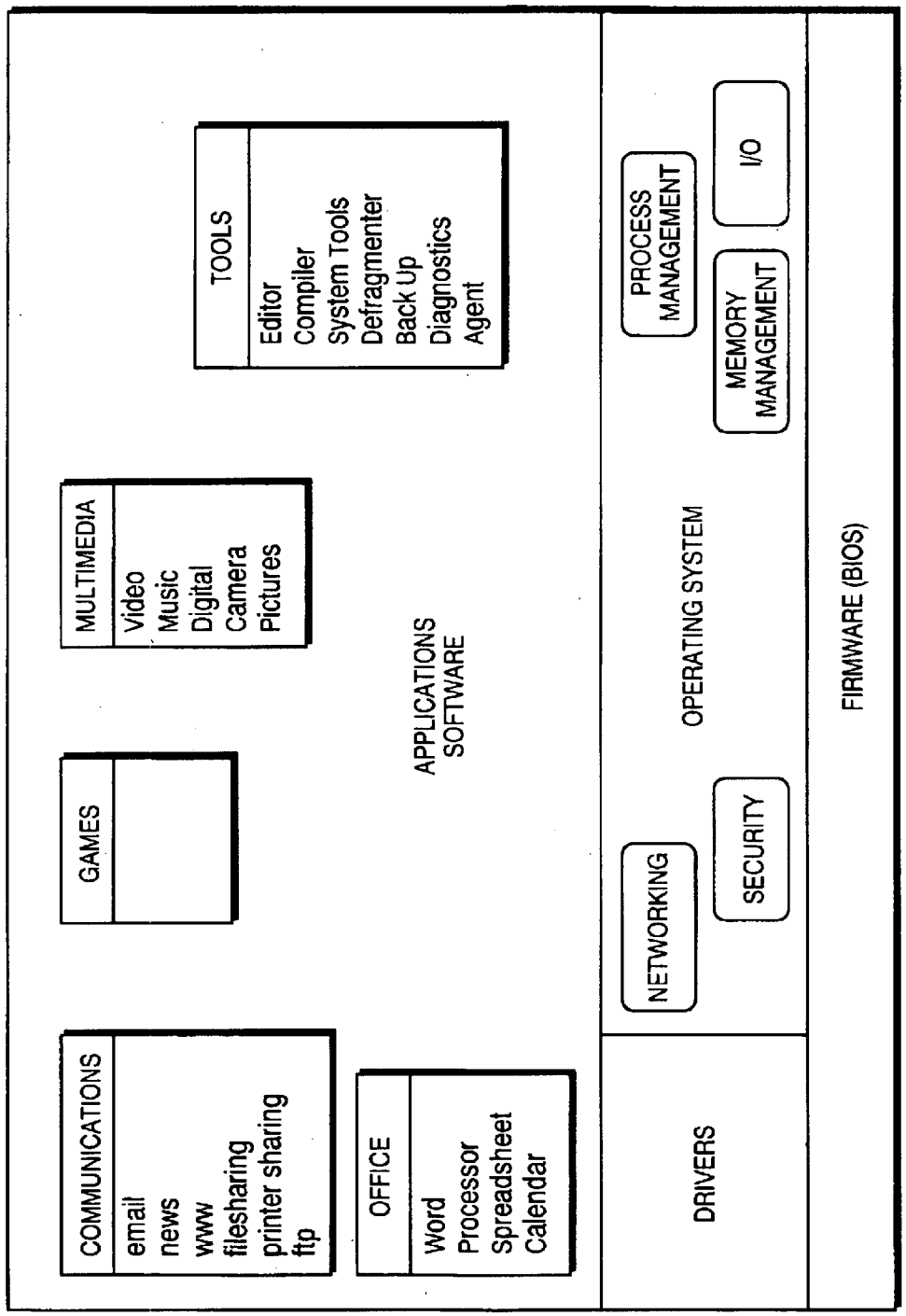
FIG. 1A is a software "field" diagram suggesting a relationship or juxtaposition between various kinds of software.

With reference to FIG. 1, there is depicted a simple client-server architecture with one client (GUI 100), one server 120 and one peripheral device disk array 170 client 100 communicates with Server 120 via network 110/180. Server 120 includes server agent software 130 which includes/controls cache memory 140. Server agent 130 further communicates with System Log. Server 120 communicates with Disk Array 170 by way of network 160. Disk Array 170 shows four disks (A,B,C,D) and a file folder containing a history log of events that have occurred on the disk array. The disk array 170 is being managed remotely by client 100, which sends a request for disk drive state changes over network 110 to server 120 which is running server agent software 130. In this instance, consider that server agent 130 has previously communicated with array 170 over network 160 to retrieve peripheral state information and has locally cached an image of the state of the array in server cache memory 140. This cached image contains the last known state of the array, including all of its physical and logical components. As server agent 130 retrieves new events from array 170, it records new entries in the System Log in server 120. This allows system administrator software (not shown) to look at the Log to determine if the disk array has caused any problems related to server 120. When server agent 130 receives a request for changes via network 110, it determines (typically using timestamping, not shown, but described in the next paragraph) whether or not the states of any of the disks have changed. Assume, for sake of illustration, that the states of disk A and disk D have changed and that a new event was generated by array 170. These changes are sent piecemeal back to GUT client 100 via network 180, as iconically depicted. Server agent 130 is not required to send all of the array state back to the client; the server agent efficiently utilizes the network by sending only "changed objects", which in this illustration involve only disks A and D. The GUI, upon receipt of the changed objects can update its display as appropriate. The foregoing is typical peripheral device state determining operation in a client-server environment involving only one server which does not give rise to the problem solved by the present invention, but is presented herein for sake of completeness.

When the server agent receives a request from the GUI for update information about the array, it shall respond in a manner permitted by the timestamp throttle imposed on it. In other words, the server agent shall respond with new and updated information about the array if the requests are made at appropriately-paced time intervals, but the server agent shall respond to too-frequent requests by supplying the information in its cache over and over again, until such time as the cache gets refreshed with new information about the array. As noted earlier, each category of array information is embodied as a software object. The use of timestamps associated with objects is a typical way to determine which objects have recently changed in the changed-state of a peripheral device. In our case, where the peripheral is a disk array, the state of the disk array is reflected in the information contained in a set of software objects stored in the server agent's cache memory. Each object in the set has an associated timestamp which describes when that particular object was last updated with information about the array. When a "request for changes" object is received by the server from a client application it can contain a timestamp indicating when the last request for changes was completed. The server agent can then compare this "request for changes" timestamp against each separate timestamp associated respectively with each one of the software objects in the agent's cache. If the timestamp comparison shows a sufficiently-long period of time from the prior request for changes with respect to any one of the objects, then that object is permitted to provide new information, if any. This comparison is done on an object-by-object basis until all of the objects in the set are polled or compared to permit a determination of which objects in the set have changed (if any). Thus, the timestamp throttle on the agent software allows an optimization of performance of the computer system, whereby the computer system is not permitted to get bogged-down in excessive internal house keeping (over-zealous reporting back on the state of the disk array). This timestamp throttle is controllable by the computer system user.

Figure 2:
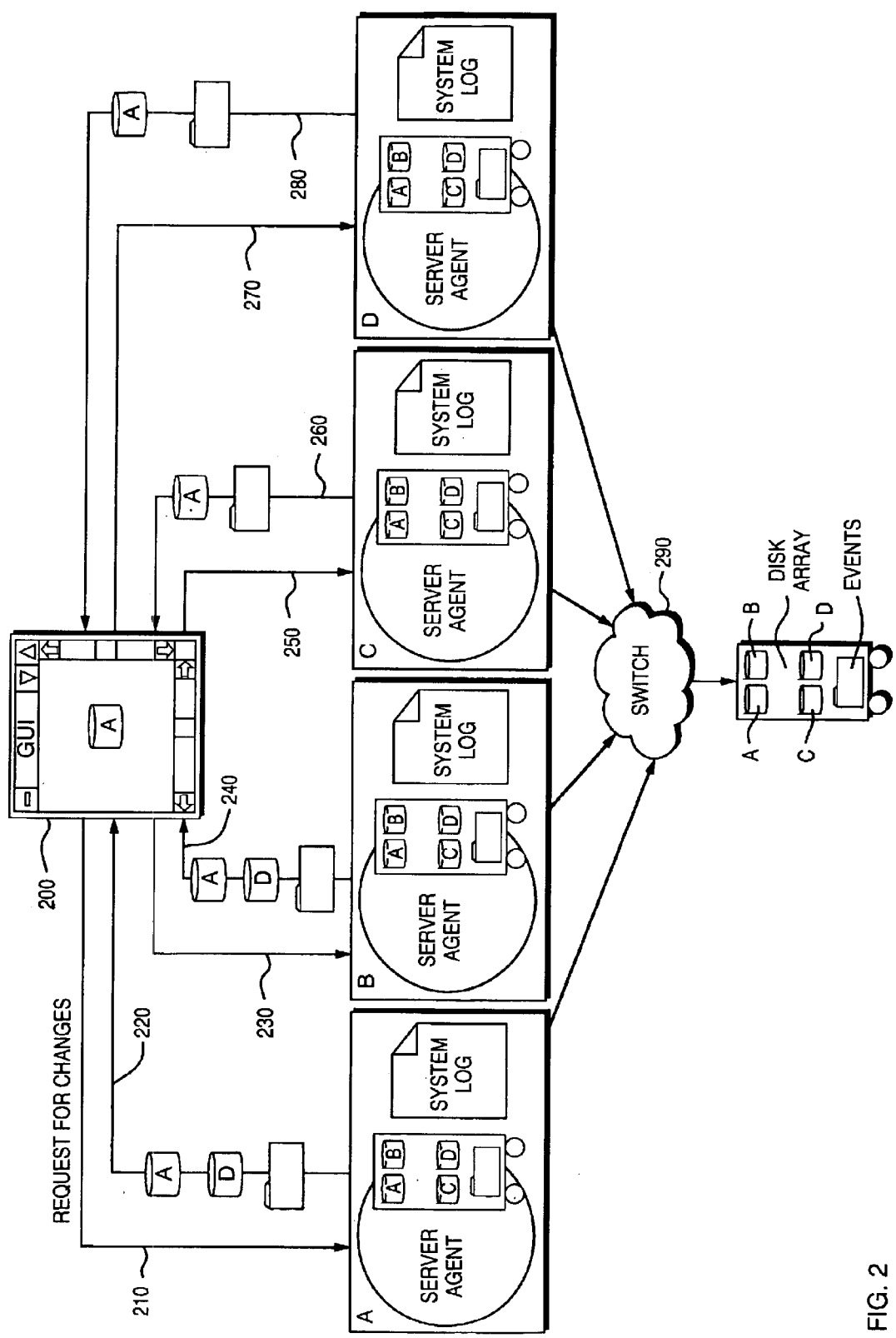
FIG. 2 depicts a client-server computer system showing multiple servers and a prior-art approach to determining operating state of the peripheral device.

Next, with respect to FIG. 2, there is shown a system similar to that of FIG. 1, but with multiple servers connected through a switch to the peripheral device disk array, rather than with only one server connected to the peripheral device. In FIG. 2, GUI client 200 is connected through a LAN (Local Area Network) comprised of pairs of communication lines 210/220, 230/240, 250/260, and 270/280 to Servers A, B, C, and D respectively, as shown. Configurations of this kind are sometimes called storage area networks (SAN's). The four servers are, in turn, connected to the disk array via fibre channel switch 290. Each server contains its own server agent software including cache memory, and System Log, as shown, each server being virtually identical to server 120 of FIG. 1. GUI client 200 needs to be connected to all four servers via, for example, the LAN, because it needs to display an error should any one or more of the servers become disconnected from the peripheral device array (a "connection failure object"). Further, a server agent is required on each server for the purpose of populating that particular server's System Log with events originating from the disk array. In operation, client 200 issues requests for changes in the peripheral device on lines 210, 230, 250, and 270 to each of the four server agents which respond in kind by sending back those changes that have occurred within the array on lines 220, 240, 260, and 280. This multiple response provides redundant information from the server agents to client 200, which is inefficient and utilizes excessive network bandwidth. Moreover, the four server agents may present conflicting information to client 200 based on the current contents of their own individual cache memories. For example, with respect to LAN lines 220, 240, 260, and 280 information is iconically depicted as follows: on line 220, state changes in disk A and disk D, and a folder containing a history log of events that have occurred on the disk array ("history log folder"); on line 240, same information as line 220; on line 260, state change in disk A and history log folder; on line 280, same information as line 260. Thus, in this example, with two different types of response described, there is both a redundancy and an inconsistency with respect to all of the information being returned from the peripheral to client 200—the data being sent on lines 260 and 280 does not include data showing that disk D changed its state, and the data being sent on lines 220 and 240 does include data showing that disk D changed its state.

DESCRIPTION OF THE PREFERRED EMBODIMENTS

Figure 3:
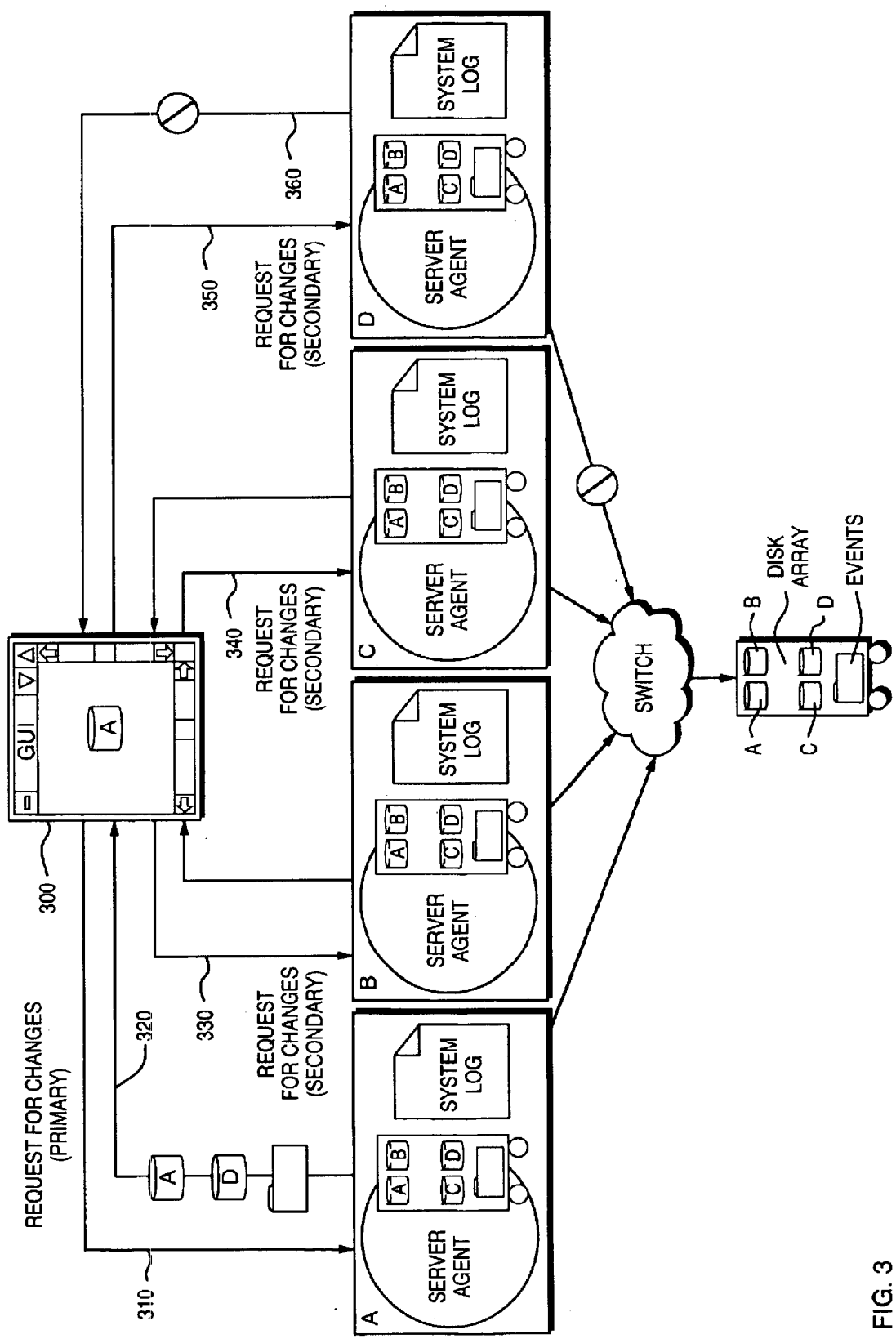
FIG. 3 depicts a client-server computer system showing multiple servers and the present-invention approach to determining operating state of the peripheral device.

Referring to the preferred embodiment of the present invention as depicted in FIG. 3, primary and secondary requests for state changes are made which eliminate the redundancy and inconsistency aspects associated with operation of the computer system of FIG. 2. In FIG. 3, GUI client 300 is connected through a LAN, comprised of pairs of communication lines 310/320, 330 & return, 340 & return, and 350/360 to Servers A, B, C, and D respectively, as shown. The four servers are, in turn, connected to the disk array via a fibre channel switch. (The switches employed in the preferred embodiment are models entitled "Silkworm 2400" and "Silkworm 2800" available from Brocade Communication Systems, Inc. located in San Jose, Calif.) This switch technology includes software that allows multiple switches to be linked together; the switches can be deployed singularly or in multi-stage "fabrics" depending on system size and complexity.) As before, each server contains its own server agent software including cache memory, and System Log, as shown, each server being virtually identical to server 120 of FIG. 1. However, in this configuration, GUI client 300 software is aware, for reasons explained in the next paragraph, that it has four separate paths available to the disk array, and the first time that it sends a "request for state changes" command, as, for example on line 310, it indicates that the command is "primary". (This can be accomplished with the setting of a pre-selected bit to a "1" indicating a primary request, versus having it set to a "zero" which would have indicated a secondary request.) This means that GUI 300 has selected this particular server's agent software as the primary way of updating management information. When the agent of Server A receives a primary request for changes, it performs the traditional method of returning primary information—all changed objects stored in its cache memory by way of line 320 (iconically shown as state changes to disk A and disk D as well as its associated history log folder). After the management software of GUI 300 has successfully received the state of the peripheral information on line 320, it can then send "secondary" requests for status or state information to other agent software located in the other servers via lines 330, 340, and 350. Any agent software that receives a secondary request ("secondary agent") for state change will recognize that the management software of client 300 has already successfully received updated objects from another agent software in the system, and the secondary agent only needs to return secondary information about the state of its connection to the array. The returns for lines 330 and 340 return normal secondary information (no icons shown), but return line 360 shows a "connection failure object" in response to the secondary request for state change received by server D on line 350. This connection failure object (a "negate" icon shown associated with line 360 and the line connecting server D to the fibre channel switch) indicates a failure in reaching the disk array through server D and indicates a disconnect or break in the conductive path, or a software disconnect. GUI client 300 management software requires that a primary request for state change of the peripheral must be successfully completed before it begins sending out secondary requests. Therefore, in this example, if the primary request on line 310 returned a connection failure object, then the next request made on line 330 would be a primary request awaiting a successful completion so that successive requests could then be secondary requests. Accordingly there is no inconsistency or redundancy in the peripheral device state information being returned to client 300 when using primary and secondary requests for this information in accordance with the present invention.

As noted above, the software in GUI client 300 is aware that, in the illustrative example of FIG. 3, it has four separate paths available to the same disk array. Every disk array is given a unique serial number that typically is installed at the time of manufacture. The client software is capable of detecting that serial number. The servers and the disk array communicate via a unique protocol, e.g. SCSI protocol, which conforms to ANSI standards. The client software indicates to a particular server that it needs the serial number information, and that server in cooperation with the disk array via the ANSI standard SCSI protocol supplies the serial number information to the client. In this illustrative example there are four servers and each server when queried by the client will follow the same procedure and supply the same serial number to the client. That is how GUI client 300 is aware that it has four separate paths to the same disk array.

Figure 4:
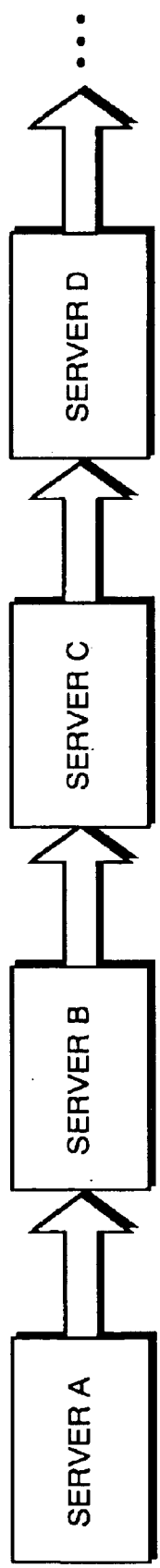
FIG. 4 is a diagram representing a table known as an "agent table" or "linked list" used within the client application software, such table of agent software being employed by each of the servers of FIG. 3.

FIG. 4 depicts an "agent table", which keeps track of how many server agents are currently attached to the peripheral device being managed. It is implemented using standard data structures such as a static array or a dynamically linked list(as suggested by the arrows in the diagram) known to those of ordinary skill in this art. In order to implement the primary and secondary algorithm for the primary and secondary requests for state of the peripheral device described above, it is necessary to write software that is employed by the client as well as the agent, and the agent table is useful in writing the software that is necessary on the client side. The content of each cell in the data table or agent table consists of the name or the IP (Internet Protocol) address of the server machine on which the agent is running. FIG. 4 shows the ordered-relationship between the four servers of the example given in the preferred embodiment hereinabove.

Figure 5:
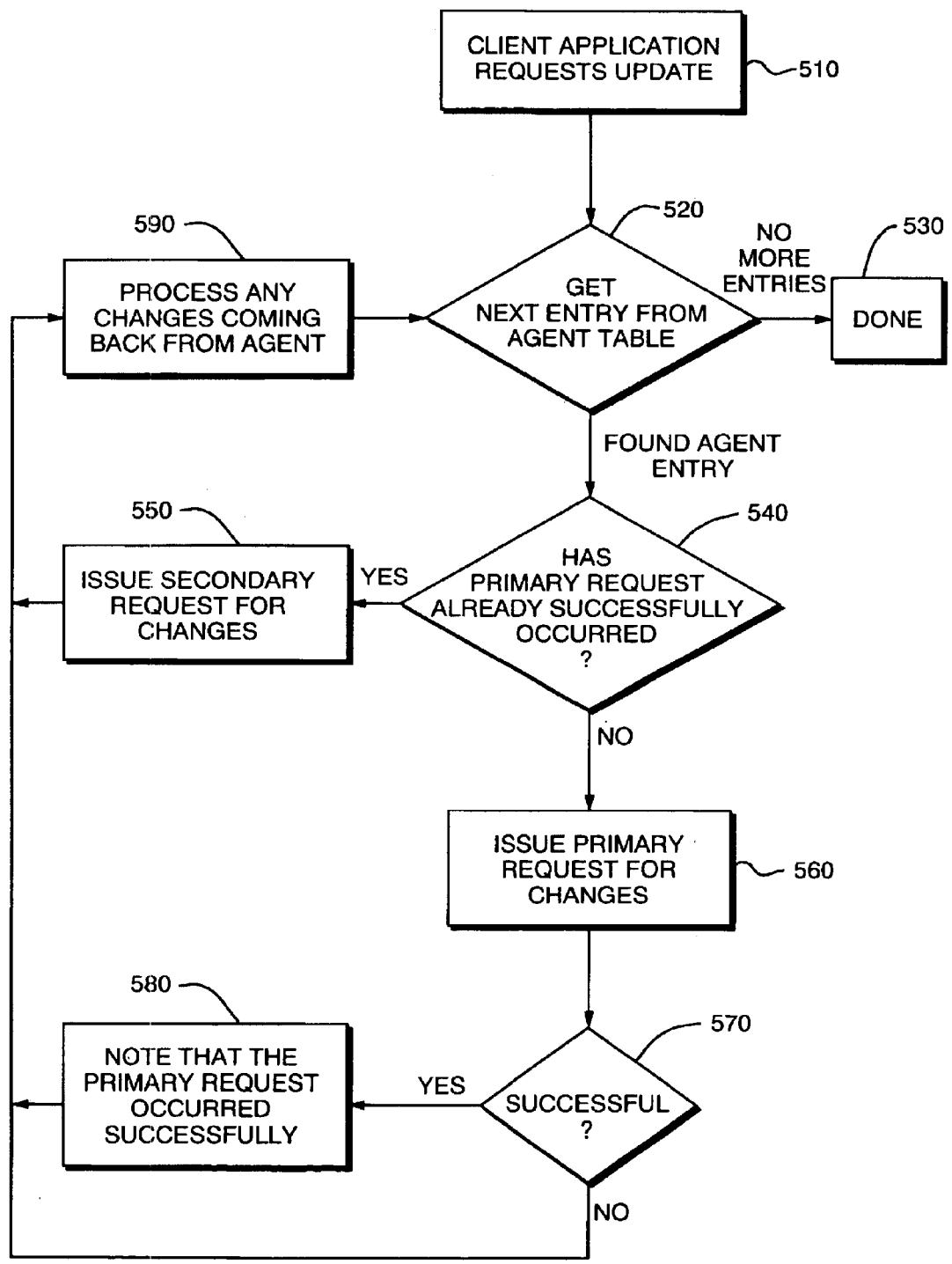
FIG. 5 is a flowchart showing the steps which the client side of the agent software must take in order to implement the primary and secondary algorithm.

Next, refer to FIG. 5 which is a flowchart that shows the steps that the client side software must take in order to implement the primary and secondary request algorithm. In step 510, the client application software begins the process of updating management information about a particular peripheral (such as the array of FIG. 3) that is connected to multiple servers and therefore proceeds to next step 520. In step 520 the client application software fetches the "first" entry from the agent table of FIG. 4 in which case Server A would be the first entry fetched from the agent table. In step 540, the client application checks whether or not an agent has already successfully completed a "primary" request for changes. In the example where "Server A" is the first entry in the agent table, the answer is "no", and the client application proceeds to step 560 and sends a primary request for changes to the agent software in the server. The process of sending a request for changes to an agent can be accomplished using industry standard client/server technologies such as RPC (remote procedure call), CORBA (Common Object Request Broker Architecture), or straight TCP/IP sockets. (A socket is a software interface used by application software to communicate across a network.) In a preferred object-oriented embodiment, a "request object" is streamed over a socket to the server agent. This request object can contain information about which particular peripheral of the group of peripherals is the target, and about the primary or secondary nature of the request. In addition this request object would commonly contain a timestamp that indicates the last time (relative to the involved agent software) that the client asked that agent for changes. The agent uses the same type of transport mechanism to send back changed objects to the client application which is the last part of step 560. In step 570, the client application software checks whether or not the request for changes was successful. If so, then the client application makes note of or remembers the fact that a primary request for changes has been completed properly. If the request did not complete properly (e.g. the server and/or the agent malfunctions) the client application proceeds directly to step 590 and bypasses step 580. Step 590 employs code that is specific to the application and allows for the processing of any "changed objects" that have come back from the server agent. For example, if the client application software is a GUI as shown in the examples hereinabove, and one of the changed objects indicates that the peripheral has a faulty disk drive, the GUI can highlight the faulted disk to inform the user that a failure has occurred. After completion of step 590, the client application software returns to step 520 to check if there are any more entries in the agent table. Again drawing upon the example in FIG. 4, "Server B" would be the next entry in the agent table. In step 540 the client application checks whether or not a successful primary request for changes has occurred, and in the case where "Server A" successfully executed a primary request for changes, the client application will proceed to step 550 and issue a secondary request for changes. After the secondary request for changes has been executed, any changes are then processed in step 590. Note that in this example, if the primary request for changes of "Server A" had failed, then the client application would issue a primary request for changes to "Server B" in step 560.

Figure 6:
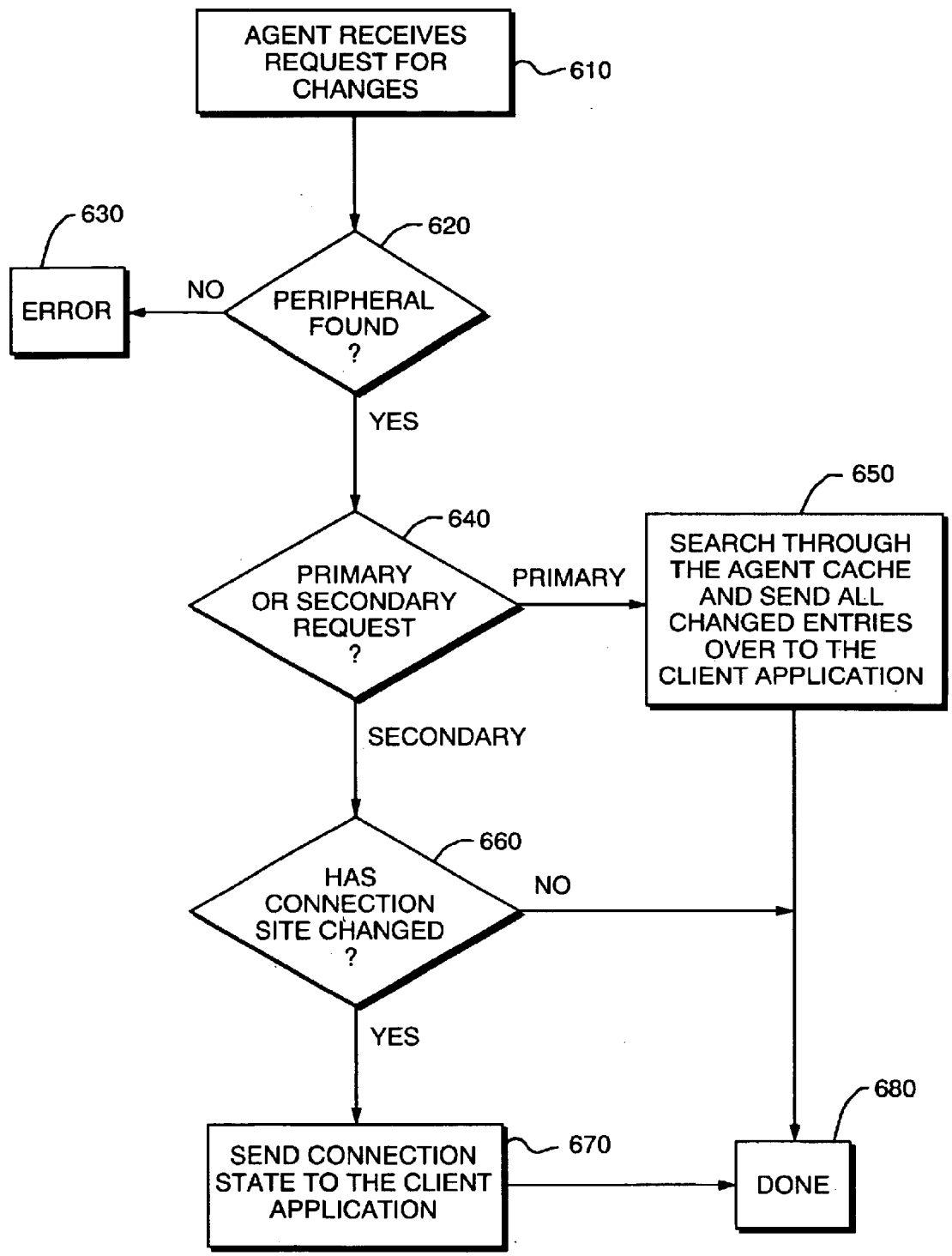
FIG. 6 is a flowchart showing the steps which the agent software takes to perform the primary/secondary algorithm.

Referring next to FIG. 6, there is presented a flowchart describing the algorithm that a particular server agent executes upon receiving a request for changes. In step 610, the agent request is received using standard client/server technology, such as RPC, CORBA, or straight TCP/IP sockets. In a preferred embodiment, a "request object" is received from a TCP/IP socket. This object, among other things, describes which peripheral is the target. It also typically includes a timestamp which indicates the last time (relative to the involved agent software) that the client application made a request for changes. In step 620, the agent verifies that the target peripheral is being managed by the agent. If it is not, an error is returned to the client application in step 630. If it is being managed, the agent proceeds to step 640. In this step, the agent determines if the request is primary or secondary based on the information that came from the client application software. If it is a primary request, the agent proceeds to step 650. In step 650 the agent cache is searched, and any objects which have a more recent timestamp than that get sent over to the client application again using standard client/server transport techniques described earlier. Note that this algorithm does not specify how nor how often the cache gets updated. The agent cache may be getting updated in step 650, or it may be getting updated as the result of the agent asynchronously contacting the peripheral at some pre-determined interval, or the peripheral may be notifying the agent that a change has occurred. Regardless of how the agent cache gets updated, the agent receipt of the primary request for changes causes changed objects to be sent to the client in step 650, at which point the agent's work is done (680) and returns good status to the client. If in step 640 the agent determines that the request for changes is secondary, it proceeds to step 660 and checks the current state of the connection to the peripheral. Again, this state may be checked as part of step 660 or as part of agent asynchronous contact with the peripheral. If in step 660 the agent detects that the connection state has changed since the last time the client application polled (by checking the timestamp), the agent proceeds to step 670 and sends the latest connection state information over to the client application, and then the agent is done (680) processing the secondary request. If in step 660 the agent determines that there has been no change in connection state, the agent sends no objects to the client and is finished with the processing of the secondary request 680.

Figure 7:
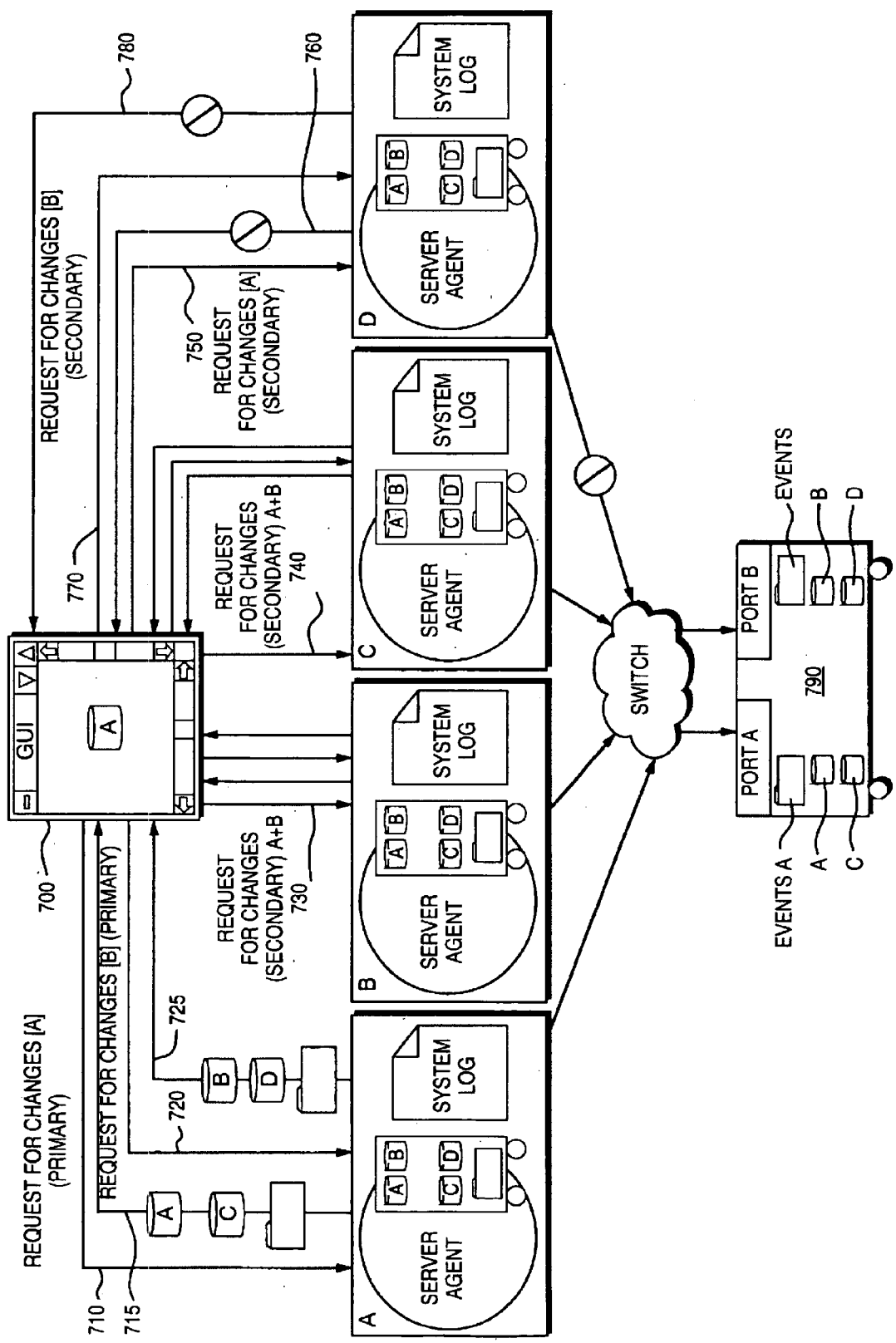
FIG. 7 depicts a client-server computer system similar to that of FIG. 3 but wherein the peripheral device has multiple ports; and, FIG. 8 is a flowchart showing the steps which the client side software must take in order to implement the primary and secondary algorithm for a peripheral device having multiple ports.

Next, referring to FIG. 7, a client-server computer system similar to that of FIG. 3 is shown, however, in this illustrative example peripheral device 790 is depicted with two ports, port A and port B. More than two ports could have been shown and more arrays and more clients could likewise have been shown; this specific two-port configuration is chosen to enhance clarity of presentation while at the same time to illustrate important aspects of the present invention. Disk array 790 is configured in such a manner that disks A and C are "owned" by port A, and disks B and D are "owned" by port B. (In other words, port A is conductively connected to and controls access to only disks A and C depicted on the port A side of the array; and port B is conductively connected to and controls access to only disks B and D depicted on the port B side of the array.) It is fairly common for a disk-array to be multi-ported which provides a higher degree of redundancy and fault tolerance as compared with a single-port device. Further, the multi-port disk array can double performance bandwidth by simultaneously transferring information over multiple channels instead of only one channel. However, the multiple port configuration presents additional complexity when the system is attempting to determine operating status or state of the peripheral device. This additional complexity is managed in the manner described hereinbelow.

As in FIG. 3, client-GUI 700 is connected to four servers each having a cache and running server agent software, and each communicating with its folder containing a history log of events that have occurred on the disk array. The servers are each connected to a fibre channel switch, (the same Brocade switch mentioned earlier can be used here also), and the switch is connected to both port A and port B on disk array 790. In operation, when client-GUI 700 undertakes to update information about the state of array 790, it must make two requests to each server because of the two ports on the array each connection has to be tested. Thus, consider two requests initally being made to server A: a primary request 710 for changes to port A, and a primary request 720 for changes to port B. In this embodiment of the present invention, for illustrative purposes, assume that disks A and C have changed and that a new event has occurred, and that disks B and D also have changed (not necessarily in the same manner as the change in disks A and C) and that a respective new event has also occurred. The agent software on server A handles first request 710 in the manner depicted by FIG. 6 and directs the request to port A on array 790. The information that disks A and C have changed and that a new event has occurred is reported back to GUI 700, iconically shown in step 715. Thereafter, agent software in server A handles request 720 directed to port B, again in a manner depicted by FIG. 6, and reports back similar information to GUI 700 that disks B and D have changed and that a respective new event has occurred, shown iconically in step 725.

At this point, GUI 700 continues to ask each of the other servers (Server B, Server C, and Server D) to perform via their respective agent softwares a secondary request for changes in array 790 via ports A and B. Server B receives a secondary request for changes 730 directed to both ports A and B of the array and returns secondary level information (no icons shown) to GUI 700. Likewise, server C receives a secondary request for changes 740 in the array directed to both ports A and B of the array and again returns secondary level information (no icons shown) to GUI 700. The secondary level information, being less than and possibly a subset of the primary level information, does not conflict with the primary level information earlier provided relative to server A. However, assuming for purposes of illustration that Server D has a broken connection to the fibre channel switch, secondary request 750 for changes to array 790 via port A results in iconically-shown failure connection object 760; similarly, secondary request 770 for changes to array 790 via port B results in iconically-shown failure connection object 780 client-GUI 700 at this point can correctly determine that server D is unable to connect to either port A or port B on the disk array.

Returning to server A, if the above scenario were changed where the connection via port A was good, but connection via port B was broken, (hereinafter known as the "server A bad port B example") then the primary request for changes in array 790 made via server A/port A would have returned primary information about the state of Disks A and C. However, the primary request made via server A/port B would have returned a failure connection object—no state information available about disks B and D. Accordingly, the next request for changes made on server B takes into account the successful primary request on Server A/port A and the connection failure object produced by server A/port B whereupon the request via server B/port A is a secondary request. Then the request for state of Disks B and D via server B/port B is made as a primary request because the prior request for state of these Disks made via Server A/port B returned a failure connection object. Assuming that the connection via server B/port B is good, then this primary request returns primary level information to GUI client 700. Accordingly, the next requests to be made of servers C and D will necessarily be secondary requests since primary level information had been earlier returned about disks A, B, C, and D as described above and no conflicting primary information is permitted.

Figure 8:
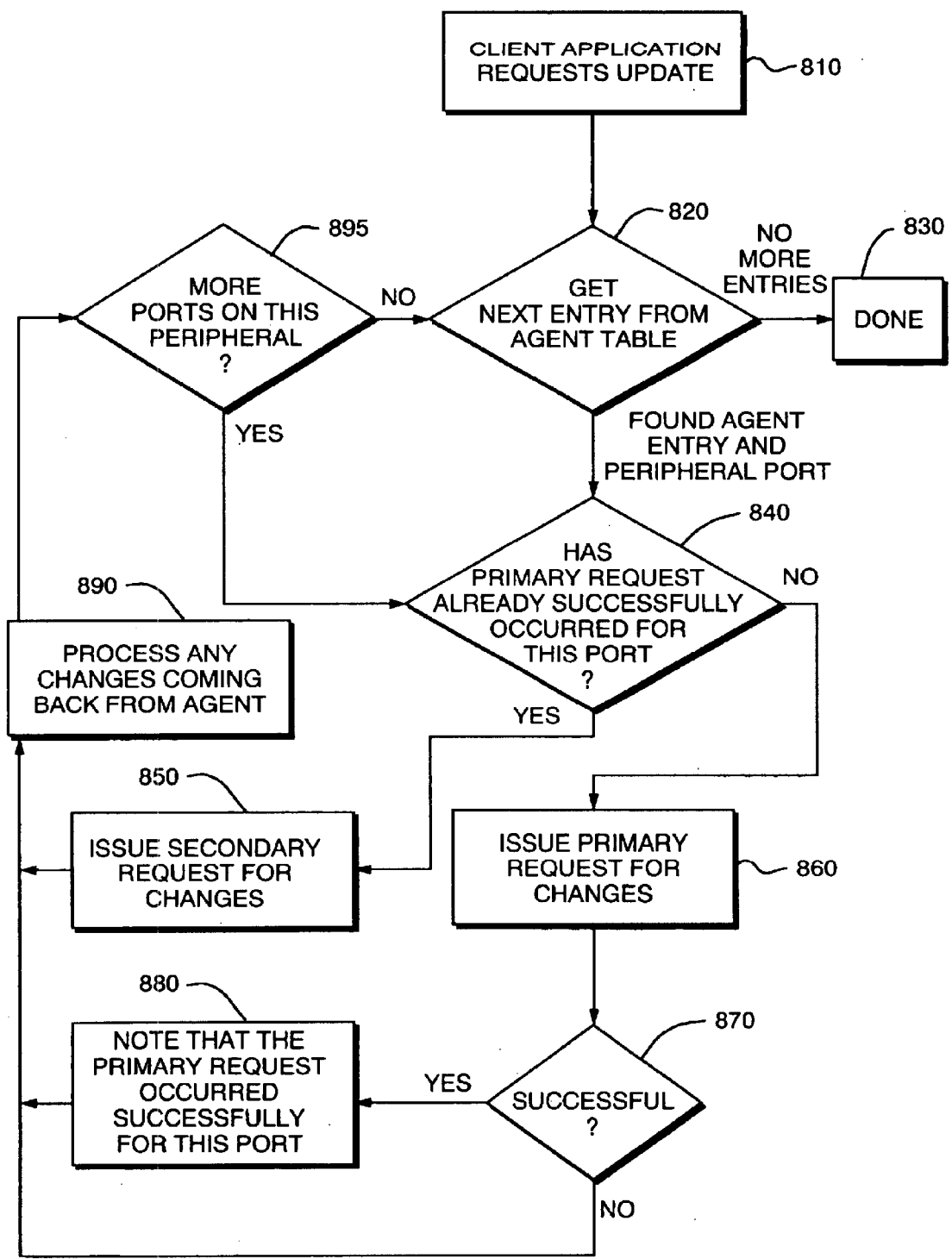

Next, refer to FIG. 8, which is a flowchart depicting the algorithm undertaken by the client-side software in order to implement primary and secondary requests for changes to the state of a multi-port disk array, not limited to two ports. (A larger number of ports is included within the methodology of this algorithm.) The flowchart is similar to that of FIG. 5, and there is only one additional box added in FIG. 8, namely: decision box 895. All other boxes are similar to their respective boxes in FIG. 5 as follows: 510/810; 520/820; 530/830; 540/840; 550/850; 560/860; 570/870; 580/880; and, 590/890. Consider client 700, in FIG. 7, requesting a disk array state report or status update (box 810). The next step for the client side software is to get the next entry from the agent table (box 820); for illustrative purposes, consider the result of this step to be selection of server A/port A, which moves the process to decision box 840. In the "server A bad port B example" described above where this is the first primary request (the first in this timeslot, based on timestamp capability, not shown) of server A/port A, the process proceeds via "No" to box 860 and issues a primary request for changes. Next, decision box 870 determines if the primary request was successful, and in our example the answer is "yes" for server A/Port A, which brings the algorithmic process to box 880 noting success for this particular server/port. Next, box 890 processes any changes coming back from server A's agent software which in this example will show a good connection through server A/port A to Disks A and C as well as good operational states of those Disks. The algorithmic process next moves to decision box 895, the only new box, which determines if there are more ports on this peripheral device. In this case, the answer is "yes", since both ports A and B exist, and port B has not yet been tested. Accordingly, the algorithmic process moves via the "yes" arrow to decision box 840 which now proceeds with respect to port B.

In our "server A bad port B" example, a primary request has not yet occurred for port B; thus, the "no" result brings the process to box 860 which allows issuance of a primary request for changes. Decision box 870, for our example, will result in a "no" answer to the question of whether or not the primary request was successful, because, in our example, server A/port B had a broken connection. The "no" arrow from decision box 870 moves the algorithmic process to box 890, which processes the changes as a failure-connection-object. The algorithmic process moves to decision box 895 which determines that there are no more ports on this peripheral. And, this time, the "no" arrow from box 895 moves the algorithmic process to decision box 820 (rather than directly down to box 840 again). In decision box 820, in our example, the next entry selected from the agent table is server B; the arrow from decision box 820 to decision box 840 implies server B/port A. Box 840 determines that a primary request did already successfully occur for this port A, thus the "yes" arrow moves the algorithmic process to box 850 this time around, where a secondary request for state changes is issued (the primary request for port A had been issued and completed via server A). The algorithmic process moves via box 890 to box 895 wherein the decision about more ports on this peripheral is made. Since there is another port, port B, the algorithmic process moves via the "yes" arrow from box 895 to decision box 840 which asks the question if a primary request already successfully occurred for this port, port B—and the answer is "no". The process now moves to box 860 to issue a primary request for changes to the state of peripheral device 790. Decision box 870 indicates, in this example, that the primary request for server B/port B is successful (which implies that the connection from server B through port B to Disks B and D of device 790 is good, as well as a good operational state of the Disks themselves), and the "yes" arrow from box 870 to box 880 allows box 880 to note that the primary request occurred successfully for this port. The process then moves through box 890, and to decision box 895 where it is determined that there are no more ports on this peripheral, and the "no" arrow from box 895 moves the algorithmic process back to decision box 820. In this example there would have to be two more iterations through the flowchart to handle servers C and D with secondary requests to both ports. After this process is completed the client software waits for a predetermined time, based on user-imposed control via a user-accessible timer-control (not shown), before the client software can once again make primary and secondary requests of the state of the peripheral device whereupon the above-noted algorithm will be implemented in software once again.

The present embodiments are to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. A computer system including a client, a plurality of servers each being connected to said client, and a peripheral device currently participating in said system and currently being managed by said plurality of servers, said computer system comprising:

means, contained within said client for initiating a primary request through no more than one of said plurality of servers for state changes occurring in said peripheral device;

means, contained within each of said plurality of servers and capable of responding to operation of said initiating means, for reporting said state changes to said client through said one of said plurality of servers;

means, contained within said client and responsive to operation of said reporting means successfully reporting said state changes to said client through said one of said servers, for initiating at least one secondary request through other of said plurality of servers for state changes occurring in said peripheral device; and, said reporting means further including (a) means for differentiating said primary request from said secondary request, and (b) means responsive to operation of said differentiating means for reporting a primary level of information detail to said client if responding to said primary request and for reporting a secondary level of information detail to said client through said other of said plurality of servers if responding to said secondary request.

2. The computer system of claim 1 and wherein said primary level of information detail is complete state change information and said secondary level of information detail does not conflict with said complete state change information.

3. The computer system of claim 2 and wherein said secondary level of information detail is less than said primary level of information detail.

4. The computer system of claim 3 and wherein said secondary level of information detail is limited to particular information associated with a particular one of said plurality of servers.

5. The computer system of claim 4 and wherein said particular information is the state of the connection of said particular one of said servers to said peripheral device.

6. The computer system of claim 5 and wherein said state of connection is a connection-failure-object.

7. In a computer system including a client, a plurality of servers each having a cache memory and each of said servers being connected to said client, and a peripheral device currently participating in said system and connected to and currently being managed by each of said servers, methodology to be practiced on said computer system for assessing said peripheral device's state change status stored in each said cache memory, said methodology comprising the following steps:

1. said client generating a request for said state change status from and through one of said servers;
2. determining if said state change status request is a primary or secondary request;
3. if primary, said one of said servers providing a complete state change status to said client;
4. if secondary, said one of said servers providing a limited state change status which does not conflict with said complete state change status, to said client; and,
5. repeating steps (1) through (4) hereinabove until each said one of said servers has provided said complete state change status or said limited state change status to said client, with said complete state change status being provided only in response to said primary request.

8. The methodology of claim 7, and wherein said limited state change status is a connection-failure-object, further including the steps of:

detecting said connection-failure-object; and unless said primary request had been generated and completed whereby a complete state change status was reported, generating said primary request as the next request.

9. The methodology of claim 7, and wherein said peripheral device has multiple ports, further including the step of conducting said request through each one of said ports via said each of said servers.

10. The methodology of claim 8, and wherein said peripheral device has multiple ports, further including the step of conducting said request through each one of said ports via said each of said servers.

11. The computer system of claim 1:

wherein said primary request has a primary request time stamp indicating time of occurrence of last most previous primary request and each of said state changes has a respective state change time stamp indicating time of occurrence of said respective state change; and, wherein those of said changes are reported to said client for which said primary request time stamp is older than said respective state change time stamp.

12. The computer system of claim 11 wherein said primary level of information detail is complete state change information and said secondary level of information detail does not conflict with said complete state change information.

13. The computer system of claim 12 wherein said secondary level of information detail is less than said primary level of information detail.

14. The computer system of claim 13 wherein said secondary level of information detail is limited to particular information associated with a particular one of said plurality of servers.

15. The computer system of claim 14 wherein said particular information is state of connection of said particular one of said servers to said peripheral device.

16. The computer system of claim 15 wherein said state of connection is a connection-failure-object.

17. The methodology of claim 7 wherein said state change status is stored in each said cache memory with a state change time stamp identifying when said state change status was entered into said cache memory and wherein said primary request has a primary request date stamp identifying when said state change status was last reported to said client, said methodology further comprising:

if said state change status request is said primary request, providing a complete state status to said client if said primary request time stamp is older than said state change time stamp.

18. The methodology of claim 17 wherein said limited state change status is a connection-failure-object, further comprising:

detecting said connection-failure-object; and unless said primary request had been generated and completed whereby a complete state change status was reported, generating said primary request as a next request.

19. The methodology of claim 17 wherein said peripheral device has multiple ports, further including the step of conducting said request through each one of said ports via said each of said servers.

20. The methodology of claim 18 wherein said peripheral device has multiple ports, further including the step of conducting said request through each one of said ports via said each of said servers.

* * * * *